US006080250A

United States Patent [19]

Urban et al.

[11] Patent Number: 6,080,250

[45] Date of Patent: Jun. 27, 2000

[54] DEVICE FOR PREPARING AND APPLYING LABELS AND A METHOD OF OPERATION THEREOF

[75] Inventors: Uwe Urban, Paderborn; Bernhard Lutz, Delbrück; Udo Tewes, Paderborn, all of Germany; Thomas Lüthi, Rafz, Switzerland; Heinz Strohdiek, Paderborn, Germany

[73] Assignee: Siemens Nixdorf Informationssysteme AG, Paderborn, Germany

[21] Appl. No.: 09/077,649

[22] PCT Filed: Dec. 2, 1996

[86] PCT No.: PCT/DE96/02308

§ 371 Date: Jun. 2, 1998

§ 102(e) Date: Jun. 2, 1998

[87] PCT Pub. No.: WO97/20739

PCT Pub. Date: Jun. 12, 1997

[30] Foreign Application Priority Data

Dec. 4, 1995 [DE] Germany .............................. 19545191

[51] Int. Cl.[7] ...................................................... B32B 31/20

[52] U.S. Cl. ............................ 156/64; 156/360; 156/363; 156/378; 156/DIG. 2

[58] Field of Search ................................ 156/64, DIG. 2, 156/DIG. 28, DIG. 31, DIG. 33, DIG. 37, DIG. 45, DIG. 49, 277, 285, 297, 351, 352, 357, 360, 363, 368, 378, 384, 387, 556, 566, 572; 221/93; 193/37

[56] References Cited

U.S. PATENT DOCUMENTS

| | | | |
|---|---|---|---|
| 3,428,509 | 2/1969 | Messmer | 156/361 |
| 4,411,349 | 10/1983 | Stedman et al. | 193/35 R |
| 4,595,447 | 6/1986 | Lindstrom | 156/364 |
| 5,342,461 | 8/1994 | Murphy | 156/64 |
| 5,399,228 | 3/1995 | Schroeder et al. | 156/542 |
| 5,540,795 | 7/1996 | Franklin et al. | 156/64 |

FOREIGN PATENT DOCUMENTS

| | | |
|---|---|---|
| 0 118 925 A2 | 3/1984 | European Pat. Off. . |
| 30 49 248 C2 | 12/1980 | Germany . |
| 33 01 439 A1 | 1/1983 | Germany . |
| 38 31 392 A1 | 9/1988 | Germany . |
| 38 31 392 C2 | 9/1988 | Germany . |
| 295 03 110 U | 2/1995 | Germany . |

OTHER PUBLICATIONS

Patent Abstracts of Japan, vol. 15, No. 489, Dec. 11, 1991.

*Primary Examiner*—Richard Crispino
*Assistant Examiner*—George R. Koch, III
*Attorney, Agent, or Firm*—Hill & Simpson

[57] ABSTRACT

A device for preparing and applying labels and a method of operating said device is provided. The device includes three parts: a roller transport track, a label dispenser and a label manipulator. The latter can pick up a label deposited by the label dispenser on the roller transport track and stick it at a predetermined point onto an object arranged in any desired way in a three-dimensional space.

26 Claims, 2 Drawing Sheets

DEVICE FOR PREPARING AND APPLYING LABELS AND A METHOD OF OPERATION THEREOF

BACKGROUND OF THE INVENTION

The invention relates to a device for preparing and applying labels and a method of operating said device.

Hand-held labeling machines are already known, using which self-adhesive labels are peeled off from a carrier strip and can be applied to an object. The carrier strip, on which a large number of labels is applied one behind another, is pulled off from a roll and, at the point of issue of the label, is led around a peeling edge. The label is transported further in a straight line, so that its gumming is exposed. At the point of issue of the label, the hand-held machine has transport rollers, with which it is rolled over the object to be labeled. In this process, the transport rollers move the carrier strip further forward, with the result that the label is completely peeled off from the carrier strip on the transport path and is rolled onto the object.

Such a hand-held machine is well suited for the application of price labels to sales articles in a department store, where large quantities of identically inscribed labels have to be applied in an arbitrary position to objects which are identically shaped in each case. By contrast, if individually printed labels have to be applied automatically in a defined position to articles that are differently shaped in each case, such as is the case, for example, in automatic mail preparation systems, the known machine cannot be used.

DE-C-38 31 392 has already disclosed a device for the application of individually printable labels to workpieces. In the case of this device, a carrier strip having a large number of labels applied thereto one behind another is used. A label is firstly, together with the carrier strip, led past a printer. After the printing, the carrier strip is led past a removal point and the label is for the most part separated from the carrier strip by deflecting the latter around a roll of comparatively small diameter. A suction gripper fastened to an industrial robot engages on the label, projecting freely into space, and removes said label from the removal point. Installed underneath the label projecting into space is a removal plate. The latter is intended to make it possible for the label to be picked up reliably by the suction gripper even when the latter has a position tolerance that is typical for such robots, through which the label otherwise would be pressed "downward".

It cannot be seen from DE-C-38 31 392 how in this case the adherence of the label to the removal plate is prevented. In addition, since a label to be removed remains connected to the carrier strip until it is removed completely, the following label can only be printed when the previous label has been removed.

U.S. Pat. No. 3,428,509 discloses a device for preparing and applying labels, in which the latter are peeled off completely from a carrier strip, pressed firmly with gumming pointing downward onto a transport roller having a rough surface and pushed by the latter onto a removal face in the access region of a label manipulator. Although the removal face is provided with ribs aligned in the transport direction of the labels, which are intended to prevent the labels from adhering, this removal face remains stationary in relation to the label while the latter is being pushed on, so that the adhesion that is unavoidably present of the gumming to the ribs must be overcome by the pushing transport roller.

SUMMARY OF THE INVENTION

The object of the invention is therefore to specify a device for preparing and applying labels, and a method of operating said device, which permit reliable removal of a label and allow the printing of a following label irrespective of the removal of the preceding label.

The object, insofar as it relates to the device, is achieved by the device according to the invention which essentially comprises three sections:

- a roller transport track having a multiplicity of shafts that are arranged in one plane, parallel to another, and can be driven synchronously, on which in each case a plurality of transport rollers is fitted in a rotationally fixed manner,
- a label dispenser, which can deposit a single label onto the transport rollers of the roller transport track, and a label manipulator, which picks up the label from the roller transport track in a predefined access region of the latter, and sticks said label at a predetermined point onto an object of any shape arranged in a three-dimensional space.

The labels are preferably applied one behind another on a carrier strip, the carrier strip provided with the adhesive labels being unwound from a supply roll, led around a peeling edge at an acute angle and, after the issuing of the labels, is wound up onto a wind-up roll. The peeling edge is in this case arranged at the input side on the roller transport track, so that a label peeled off from the transport strip is pushed onto the roller transport track. In this case, the transporting speeds of the carrier strip and of the roller transport track are equal. The peeled-off label then lies with its gumming on the transport rollers of the roller transport track. In order to avoid the label adhering to the transport rollers, the latter have a very small contact area with the label. This is achieved by the rollers being designed as pin-wheels or else as narrow Teflon disks. There is a particularly low adhesion force between this material and the gumming of the label.

Fitted to the roller transport track is a sensor, which signals the arrival of a label in the access region of the label dispenser, after which the controller of the device switches off the drive of the roller transport track. In a preferred embodiment of the invention, the label dispenser is a label printer, which operates in accordance with one of the known printing processes. Preferably, however, the label printer operates in accordance with the thermal printing process, and the labels are composed of thermal printing paper. It is particularly advantageous here to use thermal printing paper which colors red at a first printing head temperature and black at a second, higher temperature.

The label manipulator contains, as the essential component, an elastically compressible foam cushion made of a closed-cell foam material, through which the suction duct is led. The latter is connected to a vacuum pump. Using the face through which the suction duct emerges, the foam cushion can be placed over the full face onto a label located in the access region of the label dispenser. In the case of a preferred design, the foam cushion is adhesively bonded to a pressure plate, through which the suction duct is led. The pressure plate is held on a supporting plate such that it can be displaced parallel to itself along its surface normal, and is supported against said supporting plate by a compression spring. Depending on the size of the label, the label manipulator may also contain more than one pressure plate. The sucking up of the label onto the foam cushion or cushions is performed particularly reliably if the axes of the suction ducts of all the foam cushions are aligned radially with respect to a shaft of the roller transport track, which is located remote from the label edges in the central region of the label. At the same time, the axes of the suction ducts advantageously point toward the center of the space between two adjacent transport rollers located on this shaft, whose spacing corresponds to the diameter of the suction duct.

The label manipulator is fastened on a robot arm, which can move between the label dispenser and a transport track, running perpendicular to its movement track, of an object to be labeled. At the same time, the label manipulator can have its height adjusted by the robot arm and can be rotated about a vertical axis.

A labeling operation using the device previously described, which is additionally further equipped with a measuring device for the location and the dimensions of an object to be labeled, proceeds in the following manner:

Firstly, the location and the dimensions of the object to be labeled are measured. A label to be applied to the object is then issued by the label dispenser and provided on the roller transport track in the access region of the label dispenser. A negative pressure is now generated in the suction duct or ducts of the label manipulator and at the same time the label manipulator is lowered onto the label located in the access region, where said label is sucked up onto the foam cushion or cushions.

The label manipulator is now moved over the point of application of the label on the object and rotated about its longitudinal axis until the alignment of the label corresponds to its desired angular position on the object. The label manipulator is then lowered and, as a result, the label is pressed onto the object. The pressing force with which this takes place is determined here by the force of the compression spring(s). The foam cushion or cushions and, therewith, the label wraps around irregularities of the object. After a predefined period of time, the vacuum pump is switched off, the label manipulator is lifted and moved back to the roller transport track.

A particularly critical method step in the method described above is represented by the lifting of the label from the roller transport track, since the foam cushion must be placed onto the label with a certain but minimum pressure in order to suck up the label reliably. As a result, the label may adhere to the transport rollers. As has already been described, although the adhesion force is kept small by the special configuration of the transport rollers, it can be reduced still further in a development of the invention by the transport rollers being set rotating slowly during the sucking up and lifting of the label.

Further features, advantages and developments of the invention can be taken from the subclaims and the description and drawing of an exemplary embodiment that is described below.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
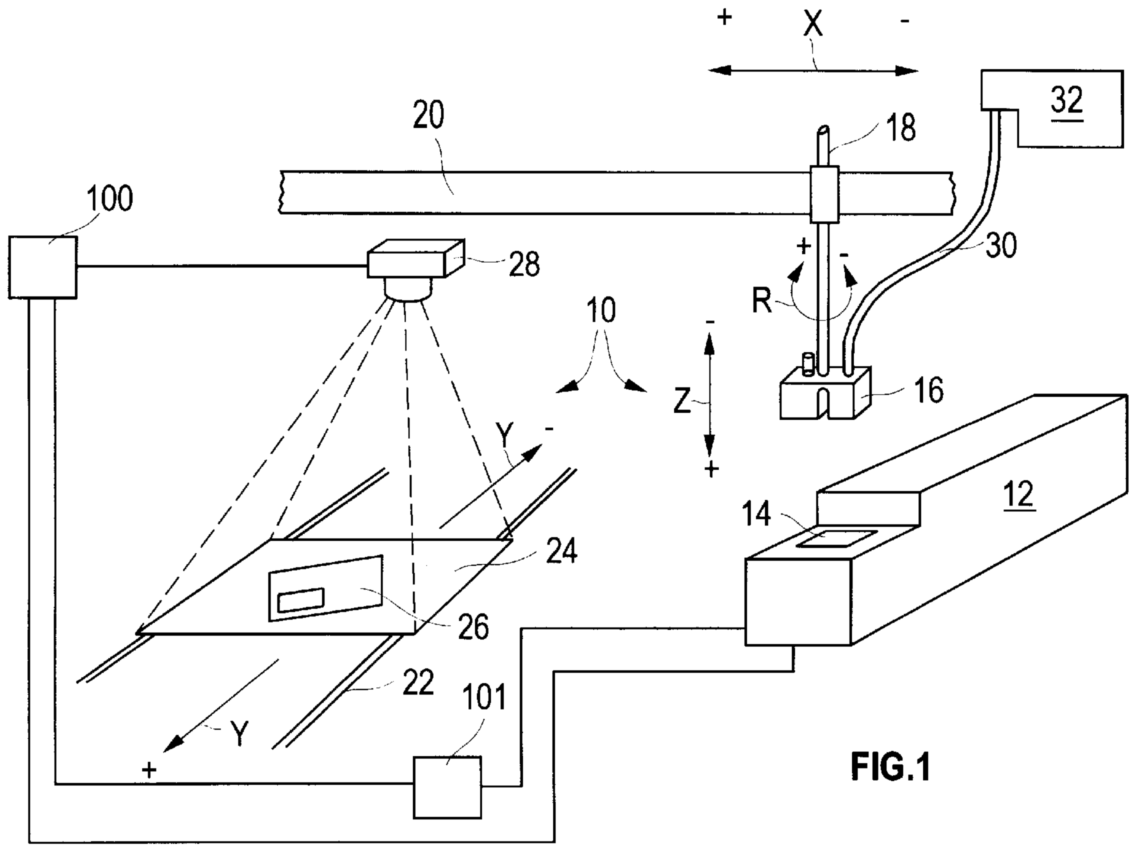
FIG. 1 illustrates a device for preparing and applying labels in a schematic illustration.

FIG. 1 illustrates a device 10 for preparing and applying labels in a schematic illustration. Said device comprises a label dispenser 12 having an access region 14 for a label manipulator 16. The label manipulated 16 is fitted on a robot arm 18. The robot arm 18 can be moved along a guide rail 20 in the direction of the double arrow X. In addition, the robot arm 18 can be lifted and lowered in the direction of the double arrow Z, and rotated about its longitudinal axis in the direction of the double arrow R.

The guide rail 20 extends from the access region 14 as far as a transport track or conveyor 22 running perpendicularly to it, on which a supporting surface 24 for an object 26 to be labeled can be displaced in the direction of the arrows Y.

Located above the transport track 22 is a video camera 28, which can record the entire surface of the supporting surface 24. The video camera or measuring device 28 is connected to a controller, which can ascertain from the video signals the dimensions of the object 26 as well as its location on the supporting surface. Depending on this information, the robot arm 18 and the position of the supporting surface 24 on the transport track 22 can be controlled. The controller 100 is also connected to a drive mechanism 101 for rotating the shafts 54 of the track 50. The controller 100 is also connected to the light sensor 74 as indicated schematically in FIG. 3. The label manipulator 16 is connected to a vacuum pump 32 via a negative-pressure or suction line 30.

Figure 2:
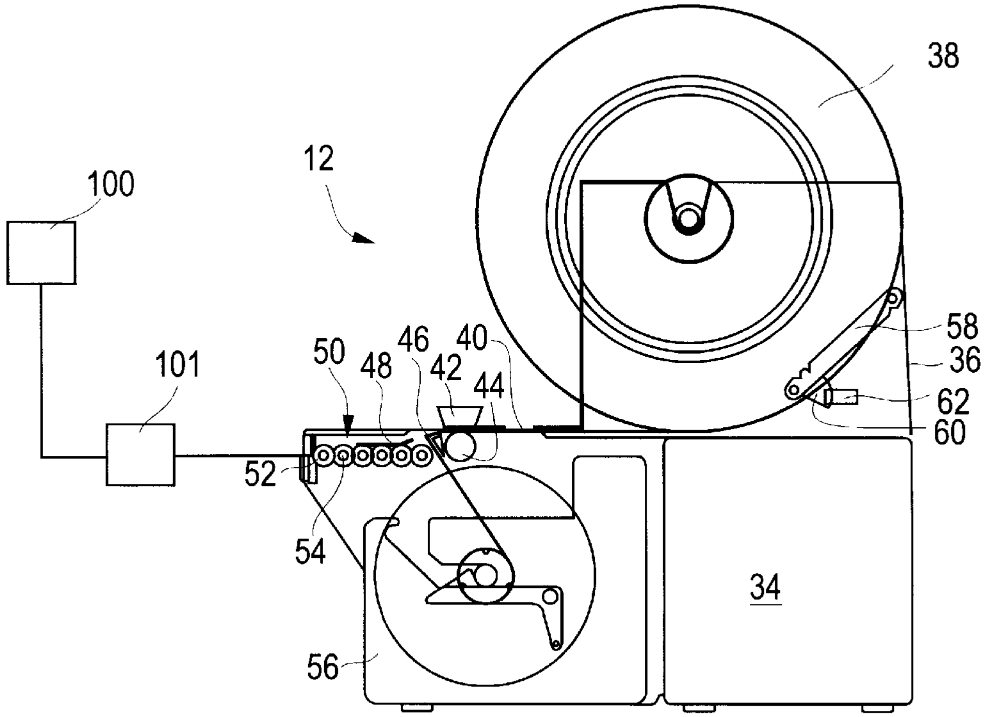
FIG. 2 illustrates a label dispenser, designed as a label printer, in a schematic side view.

In FIG. 2, the label dispenser 12 is illustrated in a schematic side view. It is designed as a label printer 34. Rotatably mounted in the upper region of the printer frame 36 is a supply roll 38, on which a carrier strip 40 for a multiplicity of self-adhesive labels 48, arranged one behind another, is rolled up. The end of the carrier strip 40 running off the supply roll 38 is led between a thermal printing bar 42 and a printing roll 44 in such a way that the label to be printed faces the thermal printing bar 42. Arranged downstream of the thermal printing bar 42 in the transport direction is a peeling bar having a peeling edge 46, around which the carrier strip 40 is led at an acute angle. As a result, the printed label 48 is peeled off the carrier strip 40 and pushed onto a roller transport track 50. In the exemplary embodiment illustrated in FIG. 2, the roller transport track 50 comprises a number of pin-wheels 52, which are fitted in a rotationally fixed manner on six shafts 54 arranged in one plane, parallel to one another. The printing roll 44 and the pin-wheels 52 are driven at a synchronous circumferential speed.

The end of the carrier strip 40 freed from the labels 48 is rolled up on a wind-up roll 56. The diameter of the supply roll 38, which is a measure of the number of labels still available, is monitored by a sensing lever 58 sensing the circumference of the supply roll 38. As soon as a switch flag 60 fitted to the latter comes out of a forked light barrier 62, the end of the carrier strip 40 is signaled to the controller, which for its part stops the device 10.

Figure 3:
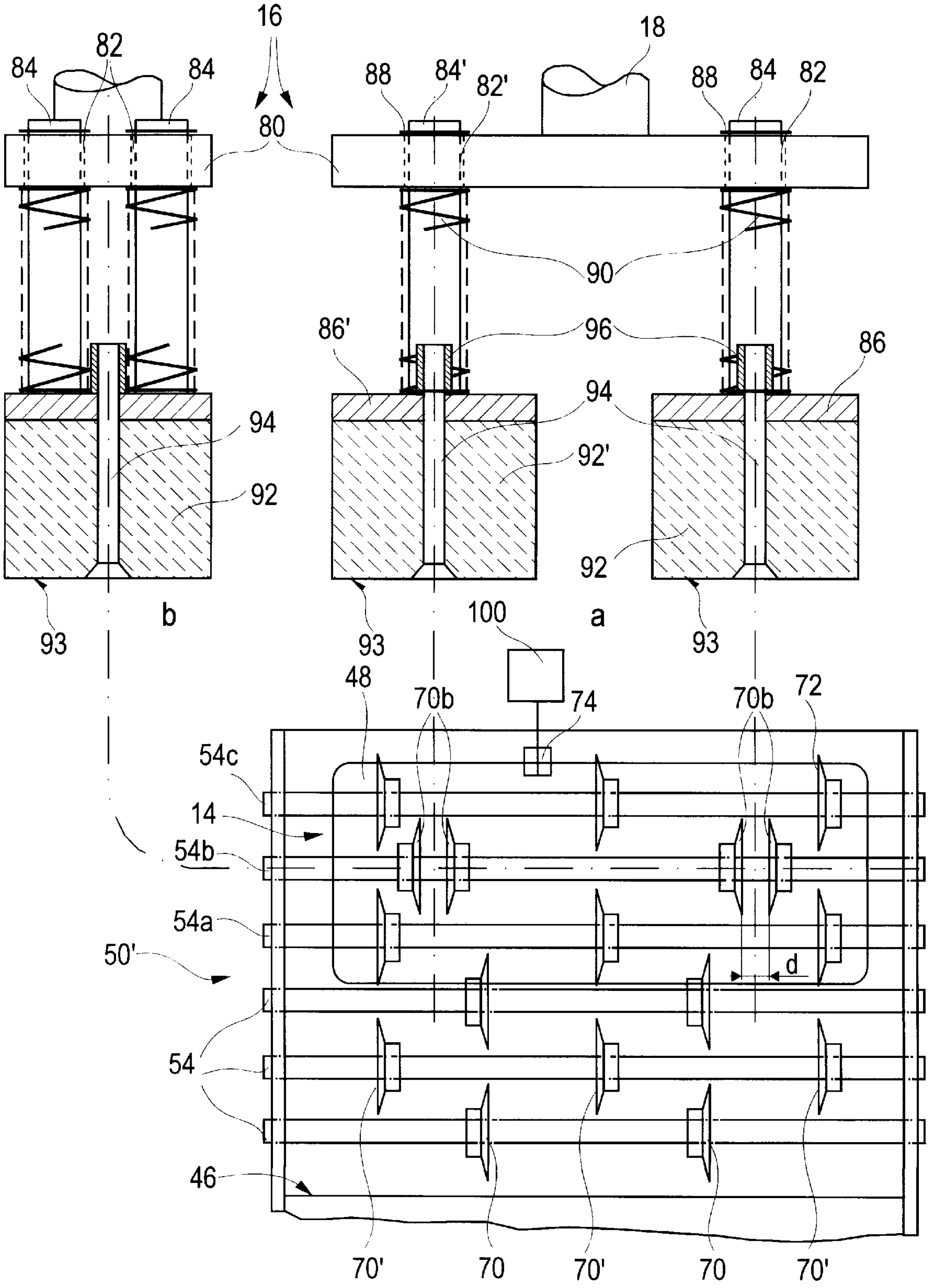
FIG. 3 illustrates a label manipulator in front and side view in its three-dimensional assignment to a roller transport track illustrated in plan view.

FIG. 3 illustrates the label manipulator 16 in front view at a and in side view at b. FIG. 3 also illustrates the three-dimensional association between the manipulator 16 and a roller transport track 50' illustrated in plan view. The track 50' differs from the roller transport track 50 only in the fact that the transport rollers 70 are designed as narrow Teflon disks, whose line of contact 72 with a label 48 is like a burr.

The transport rollers 70, 70' of adjacent transport shafts 54 are offset with respect to one another such that the transport rollers 70 of the one shaft project into a gap between adjacent transport rollers 70' of the other shaft. In this case, the spacing of the shafts 54 is only slightly greater than half the diameter of the transport rollers 70, 70'.

The access region 14 of the label dispenser 12 on the roller transport track 50' is symbolized by a label 48 resting on the latter. Said label covers three shafts 54*a*, 54*b*, 54*c*. The arrangement of the transport rollers 70*b* on the shaft 54*b* will be discussed further in conjunction with the description of the label manipulator 16.

The label manipulator 16 is illustrated in a partially sectioned front view in FIG. 3*a* and in a partially sectioned side view in FIG. 3*b*. It comprises a supporting plate 80, which is fastened on the robot arm 18. On its right-hand side in the figure, it is penetrated by two guide holes 82, and on the left-hand side by two guide holes 82'. Displaceably mounted in the latter are guide pins 84 and 84', to whose lower end a pressure plate 86 or 86' is fastened. The upper end is in each case secured by a securing ring 88 against sliding out of the supporting plate 80. Pushed onto each guide pin 84, 84' is a helical compression spring 90, which is supported on one side by the supporting plate 80 and on the other side by the pressure plate 86, 86'.

On the side of the pressure plate 86, 86' facing the roller transport track 50', a cuboidal elastically compressible foam cushion 92, 92' made of a closed-cell foamed material is adhesively bonded over the full face. Each foam cushion is penetrated by a suction duct 94 that is circular in cross section, is expanded downward like a funnel and at the top is led through the pressure plate 86 or 86', where it ends at its upper side in a hose nipple 96. A negative-pressure line 30 can be pushed onto each hose nipple (FIG. 1).

The suction ducts 94 of the foam cushions 92, 92' are arranged radially above the shaft 54*b* of the roller transport track 50'. Each suction duct in this case ends above a transport roller pair 70*b*, whose spacing d corresponds to the diameter of the suction duct 94.

This arrangement has the advantage that the label 48 is well supported in the active region of the suction ducts 94. The label is therefore not deformed in this region by the pressure of the foam cushion 92, 92' placed on it, which deformation would lead to a reduction in the suction effect of the vacuum pump 32.

The operation of providing a label in the access region 14 of the roller transport rack 50' and the lifting of the label 48 will be described below. The label is peeled off the carrier strip 40 at the peeling edge 46, and passes onto the transport rollers 70, 70' and 70*b*, from which it is transported as far as a reflection light barrier 74 which, for its part, switches off the drive of the shafts 54. At this time, the label 48 is located in the access region 14 of the label dispenser 12. The latter is now lowered onto the label 48 until the lower face 93 of the foam cushions 92, 92' lie with the full face on the label 48 and are slightly compressed under the placing pressure. As a result, the airtight sealing of the suction ducts 94 by the label is ensured. Said label is sucked up and, since the transport rollers 70 are rotated at a low circumferential speed during the placement of the foam cushions 92, 92', as well as during the sucking up and lifting of the label, is reliably lifted from the transport rollers 70. The next label can be printed as soon as the label 48 has been deposited on the roller transport track 50, 50'.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A device for preparing and applying labels, the device comprising:

a label dispenser comprising a label printer for dispensing a label to roller transport track, the track extending from the printer through an access region, the track comprising a plurality of coplanar and parallel shafts that can be driven synchronously, each shaft passing through and being rotationally fixed to at least one transport rollers, the device further comprising a label manipulator for engaging the label in the access region and transporting the label from the access region to a predetermined point on an object, the manipulator comprising a face for engaging the label, the face comprising a suction duct, the shafts and rollers of the track capable of being driven to convey the label to the access region and during sucking engagement of the label by the label manipulator.

2. The device of claim 1 wherein the shafts are spaced apart by a distance, the rollers having a diameter, the distance being greater than one-half of the diameter of the rollers.

3. The device of claim 1 wherein the rollers staggered with respect to each other.

4. The device of claim 1 wherein the rollers comprise pin-wheels.

5. The device of claim 1 wherein the rollers comprise disks fabricated from polytetrafluoroethylene.

6. The device of claim 1 wherein the dispenser further comprises a peeling edge disposed between the track and the printer for peeling a label having adhesive coated onto one side thereof off of a carrier strip, the label being pushed by the peeling edge onto the track with the adhesive-coated side engaging the track.

7. The device of claim 6 wherein the carrier strip is guided past the printer and around the peeling edge at a first transport speed, the rollers of the track being rotated at a second transport speed, the first and second transport speeds being equal.

8. The device of claim 1 further comprising a sensor for sensing the arrival of a label in the access region and for sending an arrival signal to a controller, the device further comprising a drive mechanism for rotating the shafts of the track, the controller being linked to the sensor and the drive mechanism, the controller sending a stop signal to the drive mechanism when it receives an arrival signal from the sensor.

9. The device of claim 1 wherein the suction duct is connected to a vacuum pump.

10. The device of claim 1 wherein the face of the manipulator is disposed on a lower side of an elastically compressible foam cushion fabricated from a closed-cell foam material.

11. The device of claim 10 wherein the foam cushion further comprises an upper side that is connected to a pressure plate, the suction duct passing through the foam cushion and the pressure plate.

12. The device of claim 11 wherein the pressure plate is slidably connected to a supporting plate by at least one guide pin, the pressure plate being biased away from the supporting plate by at least one spring.

13. The device of claim 11 wherein the manipulator further comprises a plurality of foam cushions, each foam cushion being slidably connected to a common supporting plate by at least one guide pin, each pressure plate being biased away from the supporting plate by at least one spring.

14. The device of claim 1 wherein the access region is disposed above a central shaft of the track that passes centrally through the access region and said central shaft passes through two rollers that are spaced apart by a spacing distance, the suction duct having a diameter, the diameter of the suction duct being about equal to the spacing distance between the two rollers of the central shaft, as the manipulator is lowered onto the access region, the suction duct is disposed in alignment with said central shaft and between the two spaced apart rollers of the central shaft.

15. The device of claim 1 wherein the access region is disposed over three shafts of the track, the suction duct being aligned with one of the shafts in this region when the face of the manipulator engages a label.

16. The device of claim 1 wherein the manipulator is connected to a robot arm, the arm being mounted to sliding movement on a guide rail between the dispenser and a transport conveyor which extends perpendicular to the guide rail and which carries the object to be labeled, the arm being adjustable in height for purposes of raising and lowering the manipulator and the arm being rotatable about a vertical axis.

17. The device of claim 1 further comprising a measuring device for measuring the location and planar dimensions of the object to be labeled.

18. A device for preparing and applying labels, the device comprising:

a label dispenser comprising a label printer for dispensing a label to roller transport track, the track extending from the printer and an access region, the dispenser further comprising a carrier strip which accommodates a plurality of spaced-apart and aligned self-adhesive labels each having an adhesive-coated side that engages the carrier strip, the dispenser further comprising a peeling edge disposed between the track and the printer, the carrier strip being guided past the printer and around the peeling edge at an acute angle whereby the label is peeled off the carrier strip and pushed onto the track with the adhesive-coated side engaging the track, the track comprising a plurality of coplanar and parallel shafts that can be driven synchronously, each shaft passing through at least one transport rollers, the dispenser further comprising a sensor for sensing the arrival of a label in the access region and for sending an arrival signal to a controller, the device further comprising a drive mechanism for rotating the shafts of the track, the controller being linked to the sensor and the drive mechanism, the controller sending a stop signal to the drive mechanism when it receives an arrival signal from the sensor, the device further comprising a label manipulator for engaging the label in the access region and transporting the label from the access region to a predetermined point on an object, the manipulator comprising a face for engaging the label, the face comprising a suction duct that is in communication with a vacuum pump, the access region being disposed above a central shaft of the track that passes centrally through the access region and said central shaft passes through two rollers that are spaced apart by a spacing distance, the suction duct having a diameter, the diameter of the suction duct being about equal to the spacing distance between the two rollers of the central shaft, as the manipulator is lowered onto the access region, the suction duct is disposed in alignment with said central shaft and between the two spaced apart rollers of the central shaft.

19. The device of claim 18 wherein the shafts are spaced apart by a distance, the rollers having a diameter, the distance being greater than one-half of the diameter of the rollers.

20. The device of claim 18 wherein the rollers staggered with respect to each other.

21. The device of claim 18 wherein the carrier strip is guided past the printer and around the peeling edge at a first transport speed, the rollers of the track being rotated at a second transport speed, the first and second transport speeds being equal.

22. The device of claim 18 wherein the face of the manipulator is disposed on a lower side of an elastically compressible foam cushion fabricated from a closed-cell foam material, the foam cushion further comprises an upper side that is connected to a pressure plate, the suction duct passing through the foam cushion and the pressure plate, the pressure plate is slidably connected to a supporting plate by at least one guide pin, the pressure plate being biased away from the supporting plate by at least one spring.

23. The device of claim 22 wherein the manipulator further comprises a plurality of foam cushions, each foam cushion being slidably connected to a common supporting plate by at least one guide pin, each pressure plate being biased away from the supporting plate by at least one spring.

24. The device of claim 18 wherein the manipulator is connected to a robot arm, the arm being mounted to sliding movement on a guide rail between the dispenser and a transport conveyor which extends perpendicular to the guide rail and which carries the object to be labeled, the arm being adjustable in height for purposes of raising and lowering the manipulator and the arm being rotatable about a vertical axis.

25. The device of claim 18 further comprising a measuring device for measuring the location and planar dimensions of the object to be labeled and transmitting a location signal indicating the locating and thickness to the controller.

26. A method of placing a label on a predetermined point on an object, the method comprising the following steps:

measuring the location of the predetermined point on the object to be labeled with a measuring device, providing a label to be applied to the object in an access region of a label dispenser, the label dispenser comprising a label printer for dispensing a label to roller transport track, the track extending from the printer through the access region, the track comprising a plurality of coplanar and parallel shafts that can be rotated synchronously, each shaft passing through and being rotationally fixed to at least one transport roller, lowering a label manipulator, the manipulator comprising a face for engaging the label, the face comprising a suction duct that is in communication with a vacuum pump, rotating the transport rollers in a transport direction directed away from the label dispenser, switching on the vacuum pump and, during said rotation of the transport rollers, sucking up the label to the face of the manipulator, lifting the label manipulator upward, moving the manipulator towards the object, positioning the manipulator and label over the predetermined point on the object, lowering the label manipulator and pressing the label onto the object, switching off the vacuum pump, lifting the label manipulator and moving the back the label dispenser.

* * * * *